United States Patent

Caveza

[11] Patent Number: 5,387,149
[45] Date of Patent: Feb. 7, 1995

[54] PIE MAKING TOY

[75] Inventor: Martin J. Caveza, Redondo Beach, Calif.

[73] Assignee: Mattel, Inc., El Segundo, Calif.

[21] Appl. No.: 143,668

[22] Filed: Nov. 1, 1993

[51] Int. Cl.⁶ .................. A63H 33/30; A21C 9/06; B30B 7/00
[52] U.S. Cl. .................. 446/479; 446/487; 446/491; 99/450.6; 100/137
[58] Field of Search .............. 446/479, 481, 487, 491, 446/4, 486; D7/669, 672–674, 697; 99/450.6, 450.7; 434/127; 100/137, 210; 426/512, 496, 502, 503; 425/324.1, 328, 298, 317

[56] References Cited

U.S. PATENT DOCUMENTS

| | | |
|---|---|---|
| D. 183,650 | 10/1958 | Gaston . |
| 2,263,490 | 11/1941 | Fox .................. 426/503 |
| 2,735,379 | 2/1956 | Stiles ................ 426/502 |
| 3,083,651 | 4/1963 | Cooper . |
| 3,131,651 | 5/1964 | Kelner et al. ......... 100/210 |
| 3,171,636 | 3/1965 | Barlow et al. . |
| 3,388,675 | 6/1968 | Marshall et al. . |
| 3,669,006 | 6/1972 | Lee .................. 425/298 |
| 3,690,248 | 9/1972 | Schafer . |
| 3,782,270 | 1/1974 | Sollerud ............. 99/450.7 |
| 3,782,271 | 1/1974 | Tobey ............... 99/450.6 |
| 4,015,518 | 4/1977 | Roth et al. . |
| 4,381,906 | 5/1983 | Mancini . |
| 4,382,768 | 5/1983 | Lifshitz et al. . |
| 4,448,576 | 5/1984 | Liu . |
| 4,493,377 | 2/1985 | Smith ............... 99/450.6 |
| 4,543,053 | 9/1985 | Sasniewski . |
| 4,608,918 | 9/1986 | Funabashi et al. . |
| 4,687,670 | 8/1987 | Rodriguez . |
| 4,953,455 | 9/1990 | Figueras et al. . |
| 5,036,756 | 8/1991 | Lindee . |
| 5,196,223 | 3/1993 | Nakamura ........... 426/502 |

FOREIGN PATENT DOCUMENTS

WO86/05070  9/1986  Australia .

Primary Examiner—Robert A. Hafer
Assistant Examiner—Jeffrey D. Carlson
Attorney, Agent, or Firm—Roy A. Ekstrand

[57] ABSTRACT

A pie making toy includes a generally rectangular base having an angularly disposed roller bed surface and a pair of upwardly extending side walls on either side thereof. A generally cylindrical roller is movable upon the roller bed surface to facilitate the flattening or compressing of a bread slice placed upon the roller bed. The rectangular base further supports an upwardly extending rectangular die having an outer cutting edge and a recess formed in the interior portion thereof. A pivotally supported crimper is pivotally secured to the base proximate the upwardly extending die. A crimping die extends downwardly from the pivotal crimper and is configured to be received upon the upwardly extending die in a precision fit. The flattened bread slice is placed within the pie making toy so as to overlie the upwardly extending die and a quantity of filling material is deposited upon the upper surface of the bread slice. Thereafter, the bread slice is folded over and the crimper is pivoted downwardly to cause the crimping die and upwardly extending die to mesh crimping the edges of the bread slice and forming an enclosing pie which captivates the filling deposit therein. A quantity of coloring material such as cinnamon or the like is then deposited upon the upper surface of the completed pie to impart a realistic baked appearance to the completed pie.

6 Claims, 2 Drawing Sheets

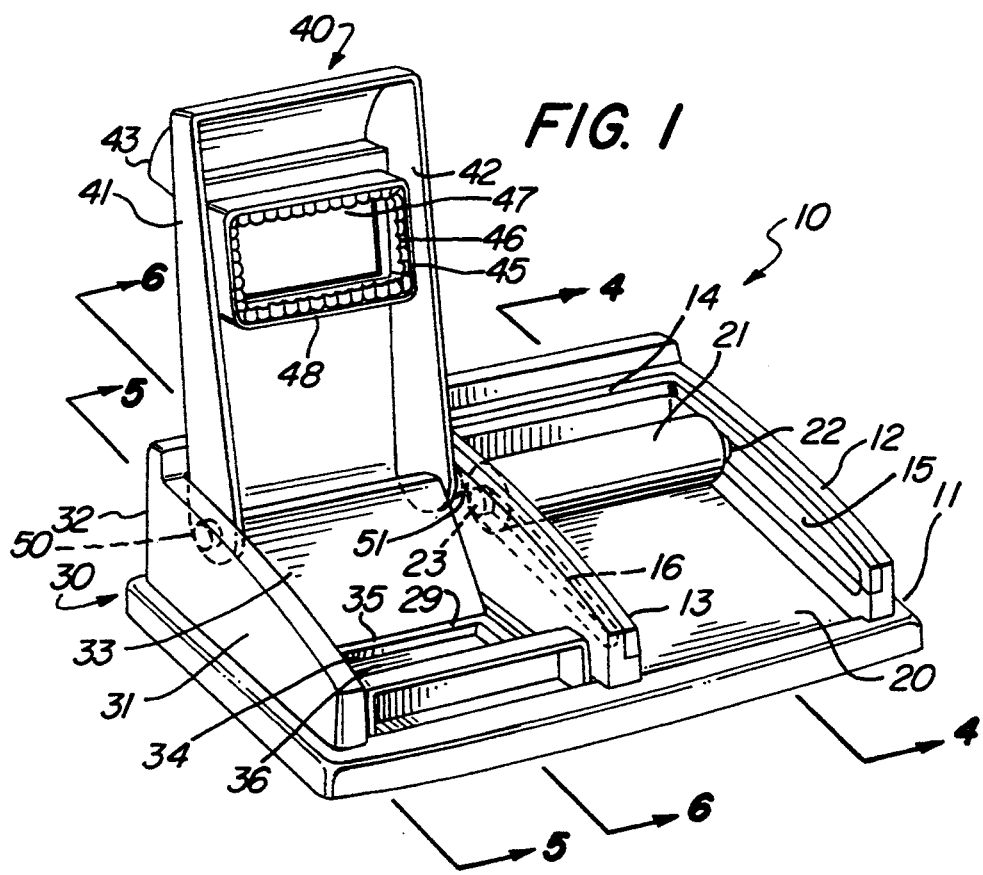
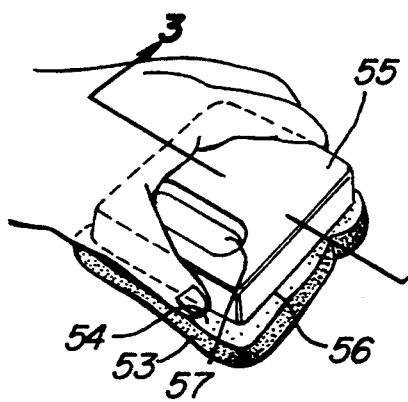
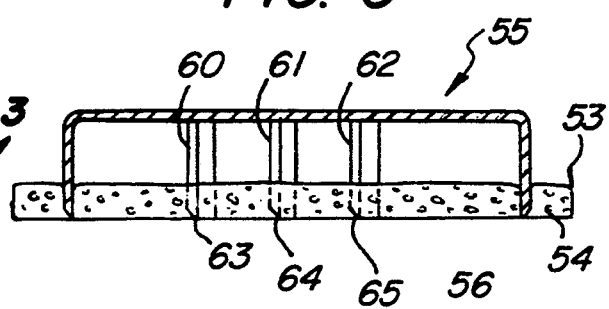
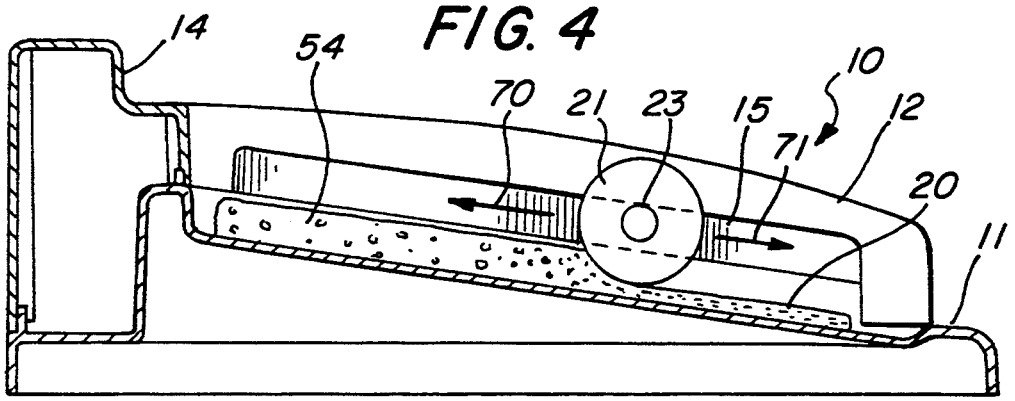

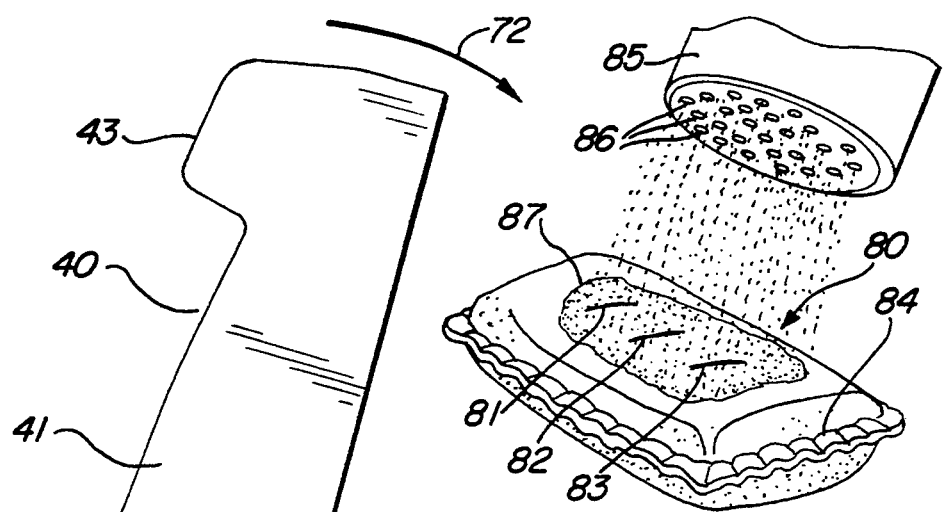
FIG. 5
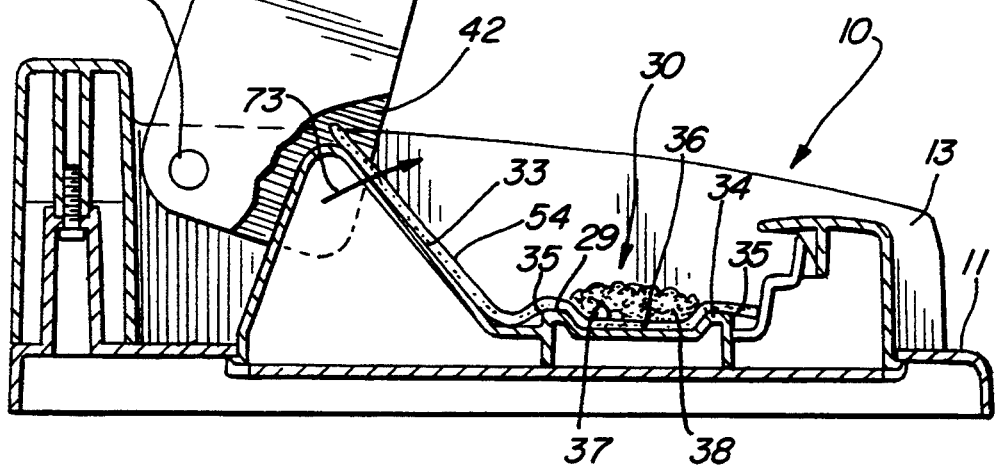
FIG. 6
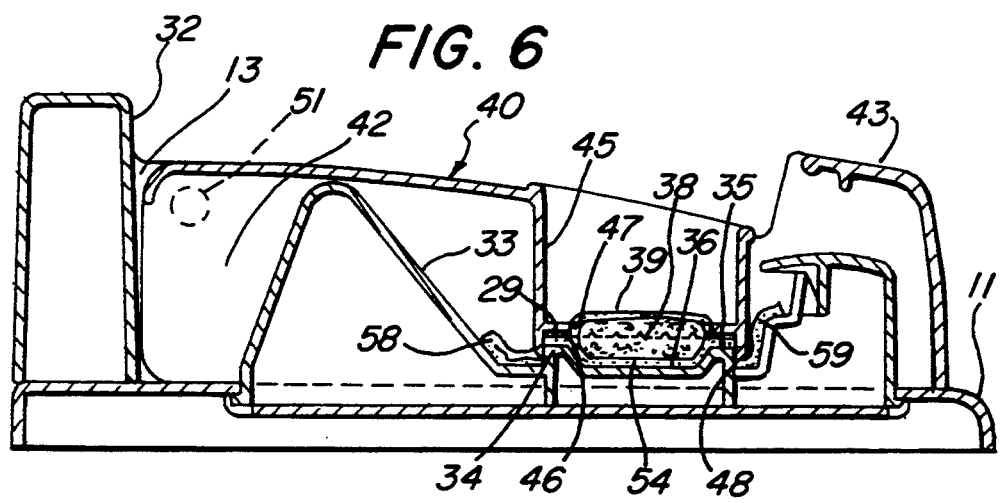

PIE MAKING TOY

FIELD OF THE INVENTION

This invention relates generally to food preparation toys and particularly to those producing an edible food product.

BACKGROUND OF THE INVENTION

Perhaps one of the most popular types of toys through the years may generally be described as food product or food preparation type toys. Such toys are available to produce both genuine food articles which may be consumed by the child as well as those utilizing simulated nonedible type articles. Children of a broad age group seem to enjoy making food treats and the like with particular enthusiasm when an edible food treat is produced. This enthusiasm seems to be particularly evident in connection with toys which mimic food preparation activities to which the child can readily relate and which bear similarity to the adult world about the child.

Faced with the popularity of food preparation toys, practitioners in the art have endeavored to create a great variety of such toy products. For example, U.S. Pat. No. 3,171,636 issued to Barlow, et al. sets forth a TOY having a base supporting a food scale and a mixing bowl. A mixing assembly having a hand crank apparatus and a pair of downwardly extending mixer beaters is supported proximate the mixing bowl such that the beaters extend thereto. The scale is operative and provides information as to the "secret recipe".

U.S. Pat. Des. No. 183,650 issued to Gaston sets forth a CHILDREN'S TOY having a food hopper within which an extruder mechanism is operative to provide motion of material placed within the hopper through a plurality of frontal holes in the hopper housing. A hand crank is coupled to the extruder apparatus and it would appear that the toy utilizes a plurality of spherical objects which are moved by the extruder as the crank is turned.

U.S. Pat. No. 3,083,651 issued to Cooper sets forth a SANDWICH MAKING DEVICE having a support base upon which a sandwich die is supported. The support base further supports an upwardly extending anvil upon which a hand operated press is supported. The press controls the motion of a second sandwich die such that the handle movement drives the second die downwardly upon the first die to form a sandwich of material placed within the first die. In its anticipated use, a plurality of bread slices having a filler therebetween is positioned within the first die prior to the pressing operation.

U.S. Pat. No. 3,388,675 issued to Marshall, et al. sets forth a PASTRY FORMING MACHINE having an automated progressive apparatus for forming a plurality of semicircular pastries having a filling formed therein. The pastry forming machine folds a circular outer "crust" to enclose the filling and crimps the outer edges together to complete the filling seal.

U.S. Pat. No. 4,543,053 issued to Jasniewski sets forth a TOOL FOR FORMING A FOLDED PASTRY operative upon a quantity of rolled out pastry dough having an edge for cutting the dough being formed in the shape of the peripheral outline of a pair of circles intersecting at two points. The two points of intersection define a line along which the dough having been cut out by the tool may be folded.

U.S. Pat. No. 5,036,756 issued to Lindee sets forth a FOOD PRODUCT CRIMPING MECHANISM having a horizontally disposed stationary die and a frame supporting a movable die in position above the stationary die. Actuation means are provided for driving the upper die downwardly upon the stationary die to captivate a sandwich-type product supported upon the stationary die and crimp the edges thereof in a sealing operation.

U.S. Pat. No. 4,382,768 issued to Lifshitz, et al. sets forth an APPARATUS FOR MAKING DOUGH ENVELOPES CONTAINING FILLING formed from molded plastic components which includes a frame structure having a plurality of interconnected hexagonal molds so as to form a honeycomb-type structure. Each hexagonal mold includes six inclined cutting edges which are connected about a central inverted conical chamber. The inverted conical chamber partially supports the dough envelope during formation to produce uniformly shaped and pleasing envelopes.

U.S. Pat. No. 4,015,518 issued to Roth, et al. sets forth an APPARATUS FOR FORMING A VARIETY OF SHAPED BODIES WITH AN INTERNAL FILLING having a generally cylindrical forming mechanism in communication with a pressurized source of filling material. The filling forming mechanism includes an inner chamber which receives the filling material, means defining a filling material transporting channel to permit the filling material to flow and a generally cylindrical shell member which is supported to obstruct the filling material transporting channel. Means are provided for opening and closing the filling material transporting channel to produce the shaped filled bodies.

U.S. Pat. No. 4,381,906 issued to Mancini sets forth an APPARATUS FOR PRODUCING RAVIOLI AND THE LIKE having a base, sidewalls rising from the base, a forming roller rotatably coupled to the sidewalls, a platen roller rotatably coupled to the sidewalls and means for feeding two sheets of ravioli dough and associated filling between the rollers.

U.S. Pat. No. 4,448,576 issued to Liu sets forth a PASTRY AND DUMPLING MAKER for shaping and forming filled pastries such as dumplings and the like. A pair of cooperating mold sections each defining a pastry shape therebetween are relatively moved into cooperative engagement after each pastry is formed. A flexible strap is suspended above the mold sections and supports a dough skin with the filling placed thereon.

U.S. Pat. No. 4,687,670 issued to Rodriguez sets forth a TAMALE MAKING METHOD in which a support panel is provided which includes a smooth upper surface and an upstanding abutment or bar extending along one margin of the panel. An open frame is pivotally supported from the upper surface of the panel adjacent the bar and is movable between a closed position and an open position.

Various other food processing apparatus are shown in U.S. Pat. No. 3,690,248 issued to Schaffer which sets forth an SANITIZABLE PASTRY FOLDING MECHANISM, U.S. Pat. No. 3,782,271 issued to Tobey, et al. which sets forth an AUTOMATIC PIE APPARATUS, U.S. Pat. No. 4,953,455 issued to Figueras, et al. which sets forth a FOOD WRAPPER APPARATUS, U.S. Pat. No. 4,608,918 issued to Funabashi, et al. which sets forth an APPARATUS FOR MANUFACTURING SEALED SANDWICH STYLE BUNS and a PCT application number PCT/AU86/00046 in the name of Merdy which sets forth a MACHINE FOR MAKING CREPES.

Despite the creation of the prior art devices such as those set forth above, there remains nonetheless a continuing need in the art for evermore amusing and enjoyable food preparation type toys.

SUMMARY OF THE INVENTION

Accordingly, it is a general object of the present invention to provide an improved food preparation toy. It is a more particular object of the present invention to provide an improved food preparation toy which fabricates edible pie treats.

In accordance with the present invention, there is provided a toy pie maker comprises: a base member defining a generally planar roller bed surface; a roller movably supported upon the base and rollable across the roller bed surface for flattening a bread slice; a stationary die supported upon the base and having an upwardly extending first cutting edge and a downwardly extending recess encircled by the first cutting edge; a crimper pivotally coupled to the base movable between a raised position generally removed from the stationary die and a lowered position generally overlying the stationary die; and a crimping die supported by the crimper and extending downwardly therefrom, the crimping die being moved into alignment with the stationary die when the crimper is pivoted to the lowered position and defining a second cutting edge slightly greater in size than the first cutting edge, the stationary die and the crimping die mating when the crimper is moved to the lowered position such that a flattened bread slice folded double upon the stationary die and enclosing a deposit of filling material is trimmed and crimped to form a bread slice pie enclosing the filling material.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a pie making toy constructed in accordance with the present invention;

FIG. 2 sets forth a perspective view of the bread cutting portion of the present invention pie making toy in operation;

FIG. 3 sets forth a section view of the bread cutting portion of the present invention pie making toy taken along section lines 3—3 in FIG. 2;

FIG. 4 sets forth a section view of the present invention pie making toy taken along section lines 4—4 in FIG. 1;

FIG. 5 sets forth a section view of the present invention pie making toy taken along section lines 5—5 in FIG. 1 in the open position;

FIG. 6 sets forth a section view of the present invention pie making toy taken along section lines 5—5 in FIG. 1 showing the closed position thereof; and

DESCRIPTION OF THE PREFERRED EMBODIMENT

FIG. 1 sets forth a perspective view of a pie making toy constructed in accordance with the present invention and generally referenced by numeral 10. Toy 10 includes a generally rectangular base 11 having a pair of upwardly extending sidewalls 12 and 13 and an upwardly extending rear wall 14. A planar surface extending between sidewalls 12 and 13 defines a roller bed 20. Sidewall 12 defines an elongated channel 15 while sidewall 13 defines a similar elongated channel 16. A cylindrical roller 21 defines a pair of outwardly extending cylindrical posts 22 and 23 received within channels 15 and 16 respectively to captivate roller 21 between sidewalls 12 and 13 above roller bed 20. Thus, roller 21 is movable upon roller bed 20 by rotation of roller 21 in the manner set forth below in FIG. 4. Pie making toy 10 further includes a press portion generally referenced by numeral 30. Press portion 30 includes a sidewall 31 spaced from sidewall 13. A generally rectangular upwardly extending die 34 defines a surrounding rectangular die surface 29 and an outer edge 35. Die 34 further defines a generally rectangular recess 36 extending downwardly from the interior portion of surface 29. Press 30 further includes an angularly extending generally planar rest surface 33 extending upwardly from die 34. A crimper 40 includes a pair of generally parallel arm members 41 and 42 supporting a rectangular crimping die 45 therebetween. A handle 43 extends transversely between the end portions of arms 41 and 42. Crimping die 45 is generally rectangular in configuration and defines a downwardly extending cutting edge 48 and a generally rectangular crimping surface 46 extending within the interior of edge 48. An aperture 47 also generally rectangular is formed within the interior portion of crimping surface 46. Arms 41 and 42 define a corresponding pair of outwardly extending cylindrical pivotal pins 50 and 51 respectively.

While not seen in FIG. 1, it will be understood that sidewalls 13 and 31 define corresponding apertures positioned to receive pivot pins 50 and 51 and thus provide pivotal attachment of crimper 40. Crimping die 45 is receivable upon die 34 as crimper 40 is pivoted downwardly from the open position shown in FIG. 1. Thus, as is better seen in FIG. 6, cutting edge 48 is slightly larger than edge 35 of die 34 while crimping surface 46 is configured to generally overlie surface 29 of die 34 when crimping die 45 is forced downwardly upon die 34. Similarly, aperture 47 is generally aligned with recess 36 in the manner also shown in FIG. 6 to facilitate the formation of the pies in the manner set forth below.

While the operation of the present invention pie making toy is set forth below in greater detail, suffice it to note here that a slice of bread having the crust portion removed therefrom in the manner shown in FIGS. 2 and 3 is initially placed upon roller bed 20 and compressed or flattened as roller 21 is repeatedly rolled over the bread slice in the manner shown in FIG. 4. The flattened bread slice is then placed within press 30 such that a portion of the bread slice overlies die 34 with the remainder of the bread slice extending upwardly upon rest surface 33 in the manner shown in FIG. 5. Thereafter, a slight manual downward pressure against the bread slice conforms the flattened bread slice in accordance with recess 36 of die 34. A quantity of edible filling such as applesauce pudding or other pastry-type filling material is placed within the depression formed in the bread slice. At this point, the portion of the bread slice extending upwardly upon rest surface 33 is pivoted downwardly to extend across die 34 and completely cover the quantity of pie filling material. Finally, crimper 40 is pivoted downwardly about pins 50 and 51 bringing crimping die 45 downwardly upon die 34 and captivating the folded bread slice and filling material in the manner shown in FIG. 6. As crimping die 45 is then forced downwardly using pressure upon handle 43, cutting edge 48 of crimping die 45 and edge 35 of die 34 cooperate to shear or cut the excess bread material from the folded assembly. In addition, the downward pressure upon handle 43 forces crimping surface 46 downwardly upon the captivated bread slices' outer periphery to exert pressure upon the bread slices between crimping surface 46 of crimping die 45 and surface 29 of die 34 thereby completing the pie making operation. The completed pie assumes the appearance shown in FIG. 5 and is then removed and preferably colored using a coloring material such as cinnamon or the like to impart a baked or cooked appearance to the pie.

It should be noted that the present invention pie making toy utilizes no heating element whatsoever and thus is operable for even younger children without exposing the child user to the inherent dangers of a heating element. The pie produced by the present invention pie making toy is intended to resemble the popular fast food pies produced in a variety of fast food restaurants with which the child is very likely to be familiar. It should also be noted that the excess bread is easily removed from the interior of press 30 leaving press 30 clean and ready to repeat the above-described cycle to produce additional pies.

FIG. 2 sets forth a perspective view of the crust trimming operation of the present invention pie making toy. A generally rectangular crust trimmer 55 defines an aperture 57 and a plurality of interior downwardly extending blades 60, 61 and 62 (seen in FIG. 3). Crust trimmer 55 defines an outer cutting edge 56. In operation, a bread slice 54 of conventional form includes a crust portion 53 encircling the bread slice. Crust trimmer 55 is placed upon bread slice 54 and forced downwardly causing cutting edge 56 to cut through bread slice 54 and simultaneously separate crust 53 from the remainder of bread slice 54 while creating a standard size bread portion having a shape and size suitable for use in press 30 in the manner described above.

FIG. 3 sets forth a section view of crust trimmer 55 taken along section lines 3—3. As described, crust trimmer 55 defines a peripheral cutting edge 56 and a plurality of downwardly extending interior blades 60, 61 and 62. Blades 60 through 62 define cutting edges 63 through 65 respectively and are utilized to impart a corresponding plurality of slots in the finished pie such as seen in FIG. 7 in which pie 80 defines angularly disposed slots 81, 82 and 83. The purpose of blades 60 through 62 is to impart this additional realism to the pie formed by pie making toy 10.

FIG. 4 sets forth a section view of pie making toy 10 taken along section lines 4—4 in FIG. 1. As described above, pie making toy 10 includes a base 11 supporting a pair of upwardly extending side walls 12 and 13 (the latter seen in FIG. 1). Toy 10 further includes an angularly disposed generally planar roller bed 20 extending between sidewalls 12 and 13. As is also described above, sidewalls 12 and 13 define respective elongated channels 15 and 16 which receive and captivate roller 21.

Thus, roller 21 is movable upon roller bed 20 in the directions indicated by arrows 70 and 71 as the user places a hand upon the upper portion of roller 21 and, while forcing downwardly against roller 21, rotates roller 21 back and forth upon roller bed 20.

In accordance with the present invention, the trimmed portion of bread slice 54 formed in the crust removing operation shown in FIG. 2 is positioned beneath roller 21 upon roller bed 20 in the manner shown in FIG. 4. Thereafter, the rolling motion of roller 21 back and forth upon roller bed 20 flattens or compresses bread slice 54 forming a thin compressed sheet of bread material.

FIG. 5 sets forth a section view of pie making toy 10 taken along section lines 5—5 in FIG. 1 and setting forth the next step in the pie making process. As described above, toy 10 includes an upwardly extending sidewall 13, a rectangular base 11 and a press generally referenced by numeral 30. Press 30 includes an upwardly extending generally rectangular die 34 having an outer edge 35 and an inwardly extending rectangular surface 29. Die 34 further includes a downwardly extending recess 36.

A pair of upwardly extending sidewalls 13 and 31 (the latter seen in FIG. 1) support a movable crimper 40 having a pair of pivot pins 50 and 51 (the latter seen in FIG. 1) supporting crimper 40 in a pivotal attachment. In the position shown in FIG. 5, crimper 40 which includes arm 41 and handle 43 is shown in the raised position which provides access to press 30 and die 34 in particular. In further accordance with the present invention, bread slice 54 having been flattened in the operation shown in FIG. 4 is placed within press 30 such that it covers die 34 and extends beyond edge 35 on one side while extending upwardly upon rest surface 33 on the remaining side. In accordance with the next operative step of the pie making process, the user forms bread slice 54 generally to recess 36 of die 34 by pushing downwardly upon bread slice 54 forming a downwardly extending bread slice pocket 37. A quantity of pie filling material such as applesauce, pudding, or other suitable pie filling type material is then placed within pocket 37 forming a filling deposit 38. Once filling deposit 38 is formed, the portion of bread slice 54 overlying rest surface 33 is folded forwardly in the direction indicated by arrow 73 to fold bread slice 54 so as to completely cover filling deposit 38 and extend beyond the frontal portion of die 34.

FIG. 6 sets forth a section view of the present invention pie making toy taken along section lines 6—6 in FIG. 1 and depicting the final process step in the present invention pie making. Thus, as can be seen in FIG. 6, toy 10 includes a base 11 having a rear wall 32 and supporting a crimper 40 in a pivotal attachment. Toy 10 includes an upwardly extending die 34 having an outer edge 35 and an inwardly extending surface 29. Die 34 further defines a downwardly extending recess 36 extending downwardly and inwardly from surface 29.

Crimper 40 includes an arm 42 pivotally secured to sidewall 13 by a pivot pin 51. Crimper 40 further includes a handle 43 and a downwardly extending crimping die 45. As is set forth above in greater detail, crimping die 45 defines a rectangular cutting edge 48 configured to be precisely received upon die 34 such that cutting edge 48 of crimping die 45 and edge 35 of die 34 cooperate to form a shear as crimping die 45 is brought downwardly upon die 34. Crimping die 45 further defines a crimping surface 29 extending inwardly from cutting edge 48 and an aperture 47. Aperture 47 is shaped in general correspondence to recess 36 of die 34.

Thus, in the position shown in FIG. 6 with bread slice 54 having been folded upon die 34 so as to enclose filling deposit 38 between the bread slices, the downward force upon handle 43 forces cutting edge 48 upon edge 35 of die 34 forming bulge 39 and provides a shearing of excess bread material about the periphery of cutting edge 48 such as exemplified by excess bread portions 58 and 59. While not seen in FIG. 6, corresponding excess bread portions are formed on either side of crimping die 45. In further accordance with the present invention, the continued downward pressure upon handle 43 forces crimping surface 46 of crimping die 45 downwardly upon the underlying portion of bread slice 54 captivated between surfaces 29 and 46. As a result, a crimped sealing seam 84 (better seen in FIG. 5) is formed about the periphery of filling deposit 38 to provide a completed pie assembly. Once the crimping operation is complete, the user lifts handle 43 pivoting crimper 40 upwardly and removes the formed pie from the interior of pie making toy 10.

FIG. 5 also sets forth a completed pie fabricated in accordance with the present invention and generally referenced by numeral 80. Pie 80 defines a plurality of angularly disposed slots 81, 82 and 83 and an encircling seam 84. Thus, pie 80 completely encloses filling deposit 38 and provides a easily handled pie which may be eaten by the child user. To provide further realism to the appearance of pie 80 and to improve the taste thereof, a conventional shaker 85 having a plurality of apertures 86 is utilized to deposit a quantity of darkening material such as cinnamon and sugar mixture or the like upon the upper surface of pie 80 to form a darkened area 87. Once darkened area 87 has been formed using shaker 85, pie 80 now assumes a realistic baked appearance and is entirely complete.

What has been shown is a novel pie making toy utilizing simple materials including a bread slice and a quantity of readily available pie filling material or the like to produce a realistically appearing edible pie similar to that found in many popular fast food restaurants. The entire pie making operation is carried forward without the use of any heating elements and thus provides a maximum of safety for the child user. The entire assembly is preferably fabricated of molded plastic components and thus is relatively low in cost, easy to manufacture and is readily disassembled to facilitate cleaning of the pie making toy.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A toy pie maker comprising:

a base member defining a generally planar roller bed surface, a pair of raised sidewalls, an upwardly angled rest surface and a raised front wall forming a recessed area therebetween;

a roller movably supported upon said base and rollable across said roller bed surface for flattening a bread slice;

a stationary die supported upon said base within said recessed area and having an upwardly extending first cutting edge and a downwardly extending recess encircled by said first cutting edge, said upwardly extending first cutting edge being substantially lower than said raised sidewalls, said upwardly angled surface and said front wall;

a crimper pivotally coupled to said base movable between a raised position generally removed from said stationary die and a lowered position generally overlying said stationary die, said crimper including a handle having an underside cavity therein for receiving said front wall in said lowered position; and a crimping die supported by said crimper and extending downwardly therefrom, said crimping die being moved into alignment with said stationary die when said crimper is pivoted to said lowered position and defining a second cutting edge slightly greater in size than said first cutting edge, said stationary die and said crimping die mating when said crimper is moved to said lowered position such that a flattened bread slice folded double upon said stationary die and enclosing a deposit of filling material is trimmed and crimped to form a bread slice pie enclosing the filling material and said sidewalls and said front wall of said base member cooperating with said handle of said crimper to enclose said stationary die and said crimping die and prevent a user's fingers from reaching said dies in said lowered position.

2. A toy pie maker as set forth in claim 1 wherein said base includes a pair of upwardly extending sidewalls on opposite sides of said roller bed surface having means for supporting said roller.

3. A toy as set forth in claim 2 wherein said roller includes a pair of outwardly extending posts and wherein said means for supporting includes a pair of channels formed in said sidewalls for receiving said posts.

4. A toy as set forth in claim 3 wherein said stationary die and said crimping die are generally rectangular.

5. A toy as set forth in claim 4 further including a bread crust removing tool having:

a housing defining a downwardly extending rectangular cutting edge; and a plurality of downwardly extending blades spaced with said cutting edge.

6. A toy as set forth in claim 5 wherein said base member further includes an angled rest surface extending upwardly from said stationary die.

* * * * *